UNITED STATES PATENT OFFICE.

MAX ISLER, OF MANNHEIM, AND ARTHUR LÜTTRINGHAUS AND HEINRICH VON DIESBACH, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION OF GERMANY.

HALOGENATED NAPHTHANTHRAQUINON AND PROCESS OF MAKING SAME.

941,320.  Specification of Letters Patent. Patented Nov. 23, 1909.

No Drawing.  Application filed June 22, 1909. Serial No. 503,636.

*To all whom it may concern:*

Be it known that we, MAX ISLER, ARTHUR LÜTTRINGHAUS, Ph. D., and HEINRICH VON DIESBACH, Ph. D., chemists, subject the second-named of the King of Prussia, the others citizens of the Swiss Republic, residing the first-named at Mannheim, the others at Ludwigshafen-on-the-Rhine, all in Germany, have invented new and useful Improvements in Halogenated Naphthanthraquinon and Process of Making Same, of which the following is a specification.

Our invention relates to the manufacture and production of halogenated derivatives of naphthanthraquinon. These derivatives are new, and we have discovered that they can be produced by condensing together halogenated phthalic anhydrid and naphthalene or halogenated naphthalene, or by condensing phthalic anhydrid with halogenated naphthalene and then in either case suitably treating the resulting halogenated naphthoyl-benzoic acid with concentrated sulfuric acid. Or we can prepare halogenated derivatives of naphthanthraquinon by the direct action on naphthanthraquinon or a sulfonic acid thereof of halogen or of another halogenating agent.

Our new halogenated derivatives of naphthanthraquinon consist in the dry state of yellow powders, they are insoluble in water and in dilute acids and alkalies, they yield reddish brown to green solutions in concentrated sulfuric acid and brown-red to red solutions in alkaline hydrosulfite solution. They can be used either for pigments or lakes, and also for dyeing and printing vegetable fiber. The yellow pigments obtained are very fast against the action of light. The compound which we desire to be understood as claiming specifically is beta-chlor-naphthanthraquinon which is obtainable by condensing beta-chlor-phthalic anhydrid with naphthalene and heating the resulting chlor-benzoyl-naphthoic acid with sulfuric acid. It has a constitution corresponding to the formula $C_{18}H_9O_2Cl$, and melts at about from 206-208° C. It yields a greenish brown solution in sulfuric acid and a brown-red solution in alkaline hydrosulfite. Compositions of matter suitable for use as pigments or lakes and containing our new halogenated derivatives of naphthanthraquinon are claimed in the application for Patent Serial No. 503639 filed June 22, 1909.

The following examples will serve to illustrate further the nature of our invention and how it can be carried into practical effect, but the invention is not confined to these examples. The parts are by weight.

Example 1: Stir together one hundred and eighty-two parts of beta-chlor-phthalic anhydrid, two hundred parts of naphthalene, and three hundred and fifty parts of nitrobenzene, and then add, while stirring, three hundred parts of aluminium chlorid during a period of three hours and while maintaining the temperature at thirty degrees centigrade. When the addition is complete, continue stirring at the same temperature for ten hours, pour the mixture onto ice and distil with steam in order to remove the nitrobenzene and the excess of naphthalene. Then extract the brown residue with boiling dilute hydrochloric acid, dissolve in hot dilute caustic soda solution, filter, and precipitate the 2-naphthoyl-4 chlor-benzoic acid by means of hydrochloric acid, and after it has solidified filter it off and press and dry it. In order to convert it into 2-chlor-naphthanthraquinon, heat it for five hours with eight times its weight of ninety-seven per cent. sulfuric acid at fifty-five degrees centigrade. Pour the solution onto ice, filter off the yellow precipitate, boil it with dilute caustic soda solution, filter again, and wash and dry. 2-chlor-naphthanthraquinon can be re-crystallized from glacial acetic acid and thus be obtained in the form of golden yellow needles melting at about from two hundred and six, to two hundred and eight, degrees centigrade.

Example 2: Stir together one hundred and eighty-two parts of beta-chlor-phthalic anhydrid, two hundred and forty parts of 2-chlor-naphthalene, two hundred and fifty parts of nitrobenzene, and then add, while stirring, at thirty-five degrees centigrade, and during a period of three hours, three hundred parts of aluminium chlorid. Then raise the temperature to sixty degrees centigrade and heat for seven hours at this temperature. Work up the product as described in the foregoing Example 1, and then convert the chlor-naphthoyl-chlor-benzoic acid into the corresponding dichlor-naphthanthraquinon by heating it on the water-bath for three hours with ten times its weight of ninety-seven per cent. sulfuric acid.

Example 3: Heat together for twelve hours, at from one hundred and forty, to one hundred and sixty, degrees centigrade, fifty parts of naphthanthraquinon, one hundred and sixty parts of trichlorbenzene, and thirty-two parts of bromin. Then dilute the cooled reaction mixture with ligroin, filter off the product and wash it with ligroin and dry it. It consists of brominated naphthanthraquinon which, in the pure state, melts at about from two hundred and twenty-seven, to two hundred and twenty-nine, degrees centigrade.

Example 4: Mix together sixty parts of naphthanthraquinon sulfonic acid (obtainable by sulfonating naphthanthraquinon with ten times its weight of fuming sulfuric acid containing twenty-three per cent. of free $SO_3$), one thousand parts of water, one hundred parts of thirty-two per cent. hydrochloric acid, and then add, at ordinary temperature, a solution of one hundred parts of sodium chlorate in seven hundred and fifty parts of water, and heat the whole for eighteen hours at one hundred degrees centigrade; chlor-naphthanthraquinon separates out in a crystalline form and can be filtered off and washed.

Now what we claim is:—

1. The process of producing halogenated derivatives of naphthanthraquinon by condensing together a phthalic anhydrid body and a naphthalene body, one at least of which is halogenated, and then heating with concentrated sulfuric acid the halogenated naphthoyl-benzoic acid obtained.

2. The process of producing 2-chlor-naphthanthraquinon by condensing together beta-chlor-phthalic anhydrid and naphthalene and then heating with concentrated sulfuric acid the 2-naphthoyl-4-chlor-benzoic acid obtained.

3. As new articles of manufacture halogenated derivatives of naphthanthraquinon, which consists when dry of yellow powders, are insoluble in water, in dilute acids and in alkalies, which dissolve in concentrated sulfuric acid with a red-brown to green color, and which dissolve in alkaline hydrosulfite yielding brown-red to red vats which dye cotton yellow shades.

4. As a new article of manufacture 2-chlor-naphthanthraquinon which consists when dry of a yellow powder, has a constitution corresponding to the formula $C_{18}H_9O_2Cl$, melts at about from 206° to 208° C., is insoluble in water, in dilute acids and alkalies, which dissolves in concentrated sulfuric acid with a greenish brown color, and which dissolves in alkaline hydrosulfite yielding a brown-red vat which dyes cotton yellow shades.

In testimony whereof we have hereunto set our hands in the presence of two subscribing witnesses.

MAX ISLER.
ARTHUR LUTTRINGHAUS.
HEINRICH VON DIESBACH.

Witnesses:
ERNEST G. EHRHARDT,
J. ALEC. LLOYD.